Figure 1:
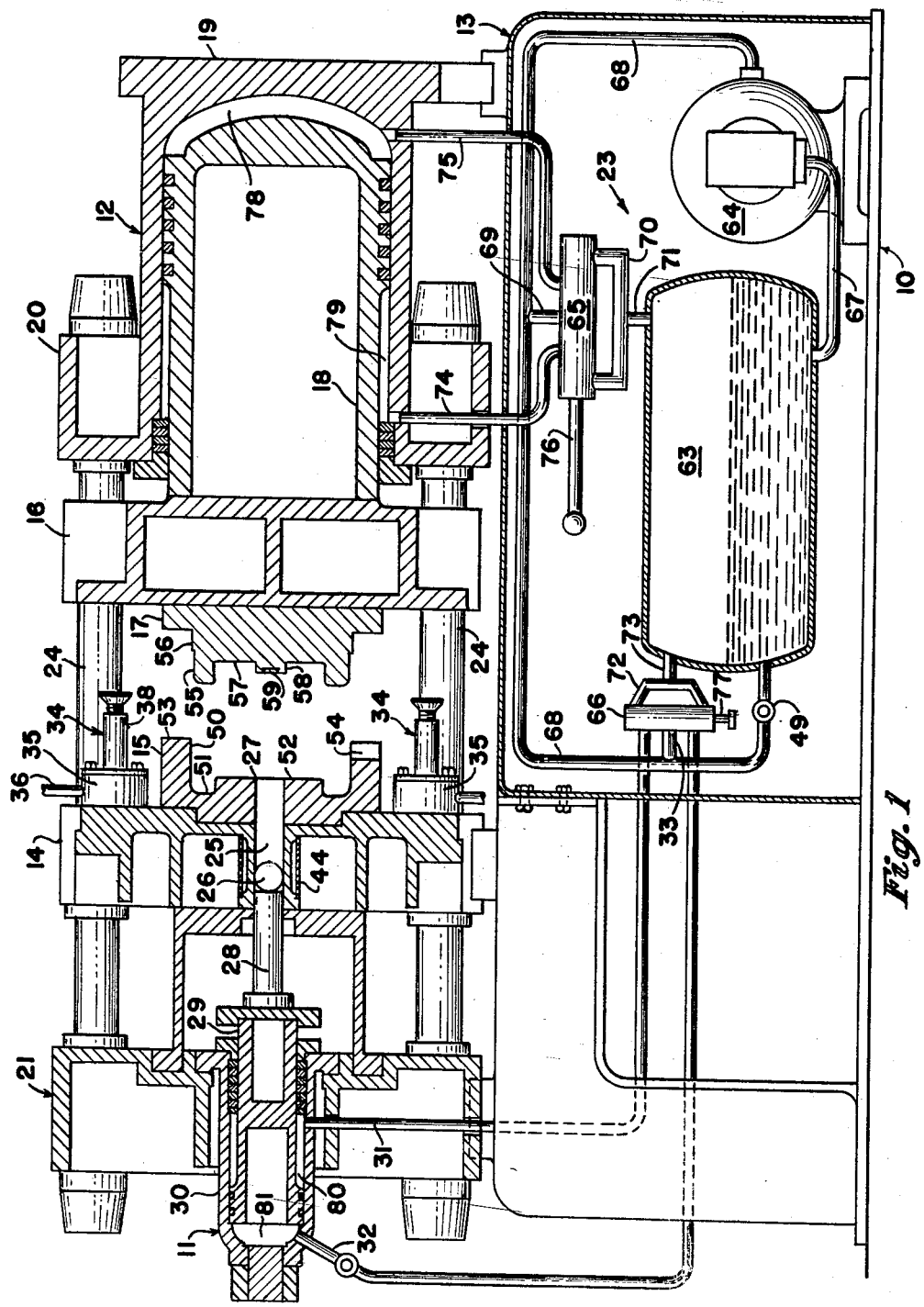

May 31, 1960 F. A. MARTIN 2,938,232
COMBINED INJECTION AND COMPRESSION MOLDING
Filed June 21, 1957 5 Sheets-Sheet 1

May 31, 1960 F. A. MARTIN 2,938,232
COMBINED INJECTION AND COMPRESSION MOLDING
Filed June 21, 1957 5 Sheets-Sheet 2

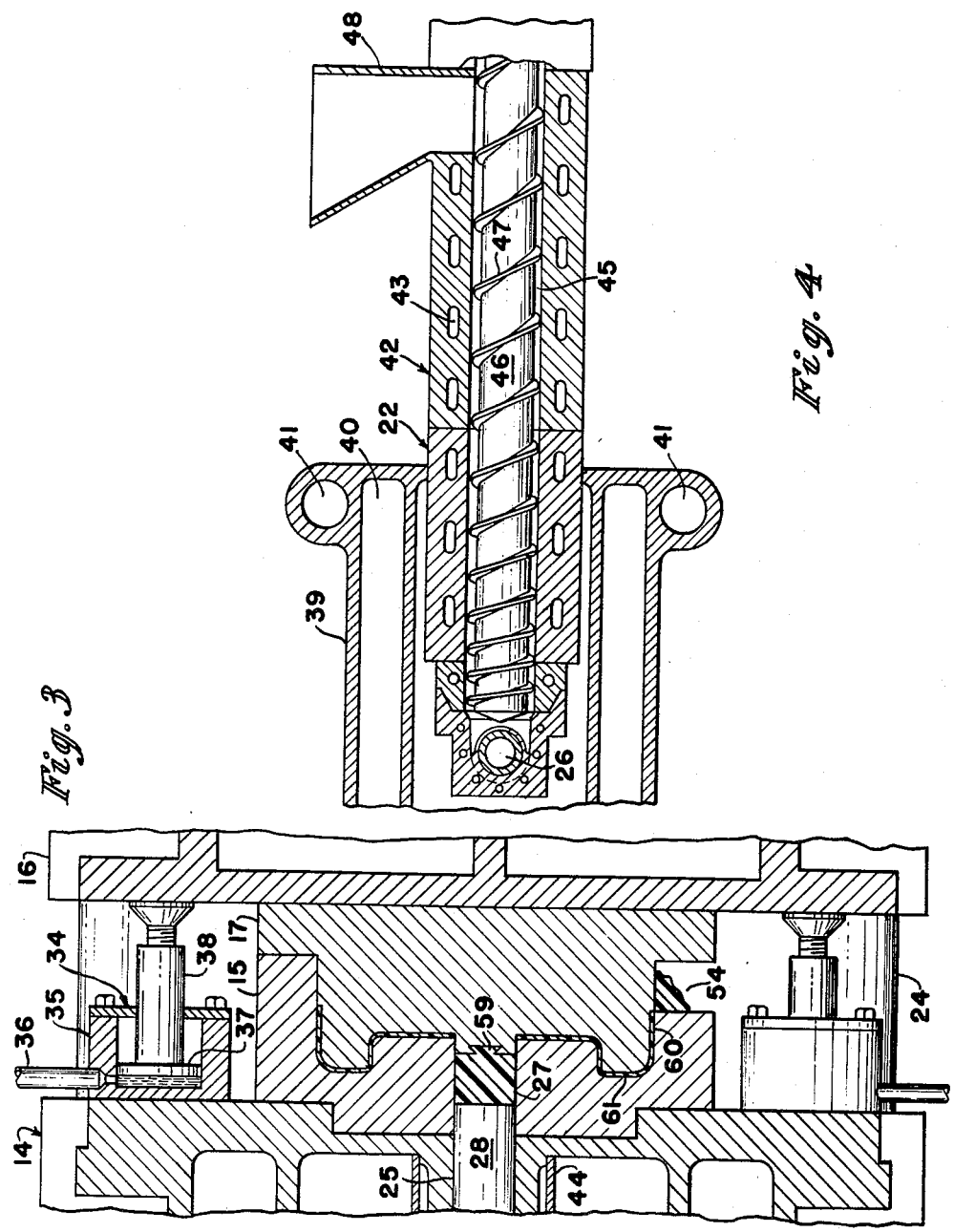

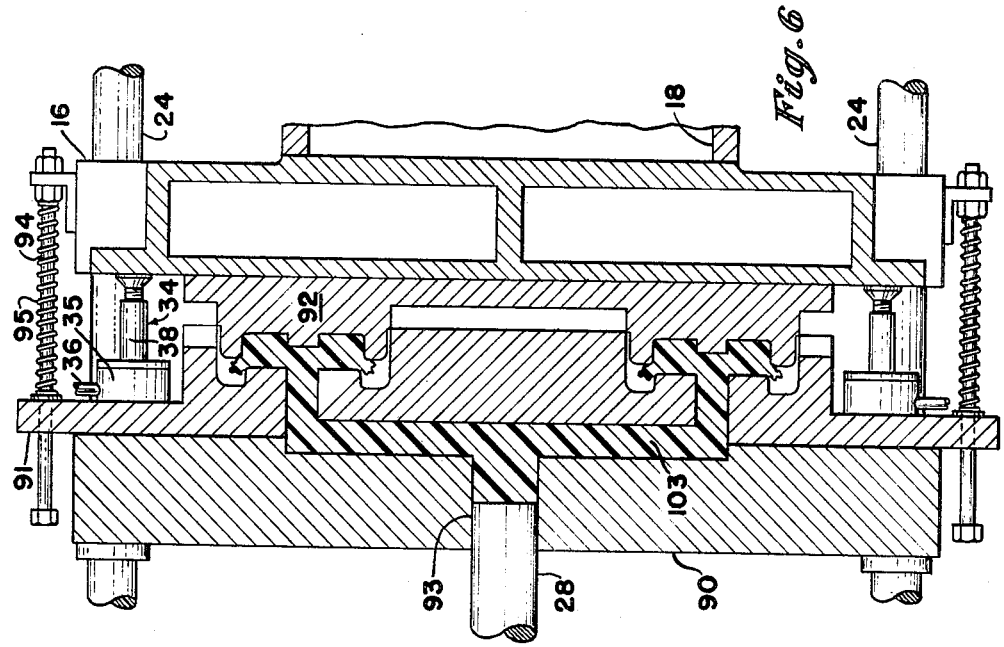
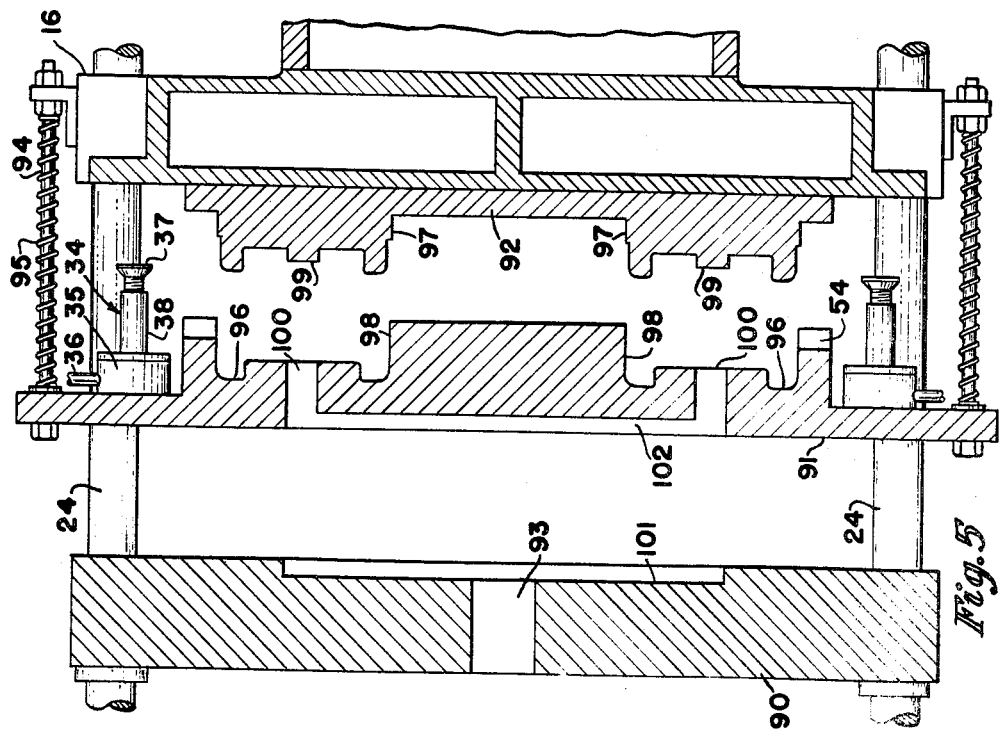

May 31, 1960 F. A. MARTIN 2,938,232
COMBINED INJECTION AND COMPRESSION MOLDING
Filed June 21, 1957 5 Sheets-Sheet 5

United States Patent Office 2,938,232
Patented May 31, 1960

2,938,232

COMBINED INJECTION AND COMPRESSION MOLDING

Frank A. Martin, Akron, Ohio, assignor to The Hoover Company, North Canton, Ohio, a corporation of Ohio Filed June 21, 1957, Ser. No. 667,136

3 Claims. (Cl. 18—30)

The present invention relates to molding apparatus and more particularly to an apparatus for molding large complex moldings requiring high molding pressures in order to insure that all spaces of the mold cavity are completely filled with the molding material when the molding operation is completed and to the method of molding by such an apparatus.

Specifically, according to the present invention, a molding apparatus is provided in which the die or mold is only partially closed when the plastic material is injected into it so that a relatively low pressure may be used to inject the plastic material into the mold cavity. After the plastic material is injected into the mold cavity, the die parts are brought together to distribute the plastic material throughout all parts of the mold cavity. At a point in the die closing movement and before the final high molding pressure has developed, communication between the mold cavity and the injection cylinder is cut off so that the final high molding pressure is not reflected into the injector cylinder so that the injection mechanism is protected against the high molding pressure produced in the mold cavity.

According to the invention, a movable die part is first moved toward a fixed die part until the mouth opening to the die cavity is just closed, at which time the movement of the movable die part is momentarily arrested and the plastic material is injected into the mold cavity under a comparatively low pressure. A pressure is built up behind the movable die part until the arresting force is overcome and the movable die part will continue to move toward the fixed die part. At a point before the die cavity is completely closed a boss on the movable die part enters the opening through which the plastic material is injected and thus closes off communication between the interior of the die cavity and the injection cylinder. The movable die part then continues to move toward closing position and forces the plastic material into all parts of the die cavity under extremely high pressure which will not be reflected into the injection cylinder. The space between the boss and the injection ram forms a sprue or cull which is entirely separate and separated from the material in the die cavity which forms the finished molding. Thus both the finished molding and the sprue are easily removed when the die parts are again separated.

The high molding pressure created when the dies are moved to final closing position results in an improved finished molding. Firstly, the high pressures used will produce a finished article having a highly glossy finish, which will not have to be refinished after the molding operation, and the finished article will be free from weld lines. Secondly, the compression type molding operation which results from this process produces a finished article having better dimensional stability which may be explained as follows: When a thermoplastic material is injection molded, internal stresses are set up in the walls of the finished article which tend to warp the article from its original molded state. These stresses are the result of material temperature and pressure differentials which are set up when the thermoplastic is forced through the various passages within the mold. If the finished article is heated those internal stresses tend to be released resulting in a warpage of the finished article. The compression type of molding herein disclosed results in a finished article with a minimum of internal stresses, and thus results in an article with better dimensional stability. In an article with a high degree of internal stresses, warpage occurs at comparatively low temperatures, and may even occur at the operating temperatures of vacuum cleaners. However, at the high compression molding pressures, which are attained by the present invention, such warpage will not occur until considerably higher temperatures are reached.

Thirdly, finished articles with greatly increased strength are attained by the present invention. The minimal internal stresses and weld lines resulting from the compression type molding result in greatly improved impact strength.

According to a modification of the present invention, a mold is provided for molding a plurality of moldings in a single operation. According to this modification a pressure die part movably carries a central die part and both are moved toward a fixed platen until the central die part comes into contact with the fixed die platen. The facing faces of the pressure die part and the central die part are formed to provide a plurality of mold cavities between them when completely closed. The pressure die part then continues to move toward the fixed die platen after movement of the central die part has been arrested until the mouth openings of the die cavities are closed, at which time further movement of the pressure die plate is temporarily arrested. At that time the plastic material is injected under comparatively low pressure into the mold cavities through a gate opening between the central and fixed die plates and through the central die plate and leading from the injection cylinder to the interior of the mold cavity.

Pressure is then built up behind the pressure die part sufficient to overcome the arresting force and the pressure die part continues to move toward molding position. Before the pressure in the die cavities has been built up to the final molding pressure, bosses on the pressure die part enter the charging openings leading through the central die part and close off communication between the interior of the mold cavities and the interior of the injection cylinder. The sprue material in the passages between the injection ram and the bosses is also separated from the material in the mold cavity. As the pressure die part continues to move to die closing position the plastic material in the mold cavity is forced to all parts thereof under very high pressure. When the die parts are again opened the finished moldings may be easily removed from the cavities between the pressure and central die parts and the sprue material easily removed from the cavity between the central and fixed die parts.

Another object of the present invention is to provide a method of molding a part which requires an aperture through its wall by means of a mold having a charging opening which corresponds to the aperture in the article, in which plastic material is charged into the mold through the charging opening, in which the mold is partially closed to apply a distributing pressure to the material and further closed to displace the material from the opening and form the aperture and in which a molding pressure is thereafter applied to the material to form the apertured finished article.

Another object of the present invention is the method of operating a molding apparatus of the type having a movable die part and a fixed die part formed with at least one die cavity between them, formed with the charging opening in the fixed die part and a boss for closing said opening formed on the movable die part comprising, moving the movable die part toward the fixed die part to a position in which the mouth of the die cavity is closed, arresting movement of the movable die part toward the fixed die part and charging plastic material through the charging opening into the partially closed cavity, continuing movement of the movable die part toward die closing position to bring the boss into closing position relative to the charging opening and remove plastic material from the mouth of the charging opening and in which movement of the movable die part is continued to its fully closed position under high pressure to force the plastic material into all parts of the mold cavity.

Figure 2:
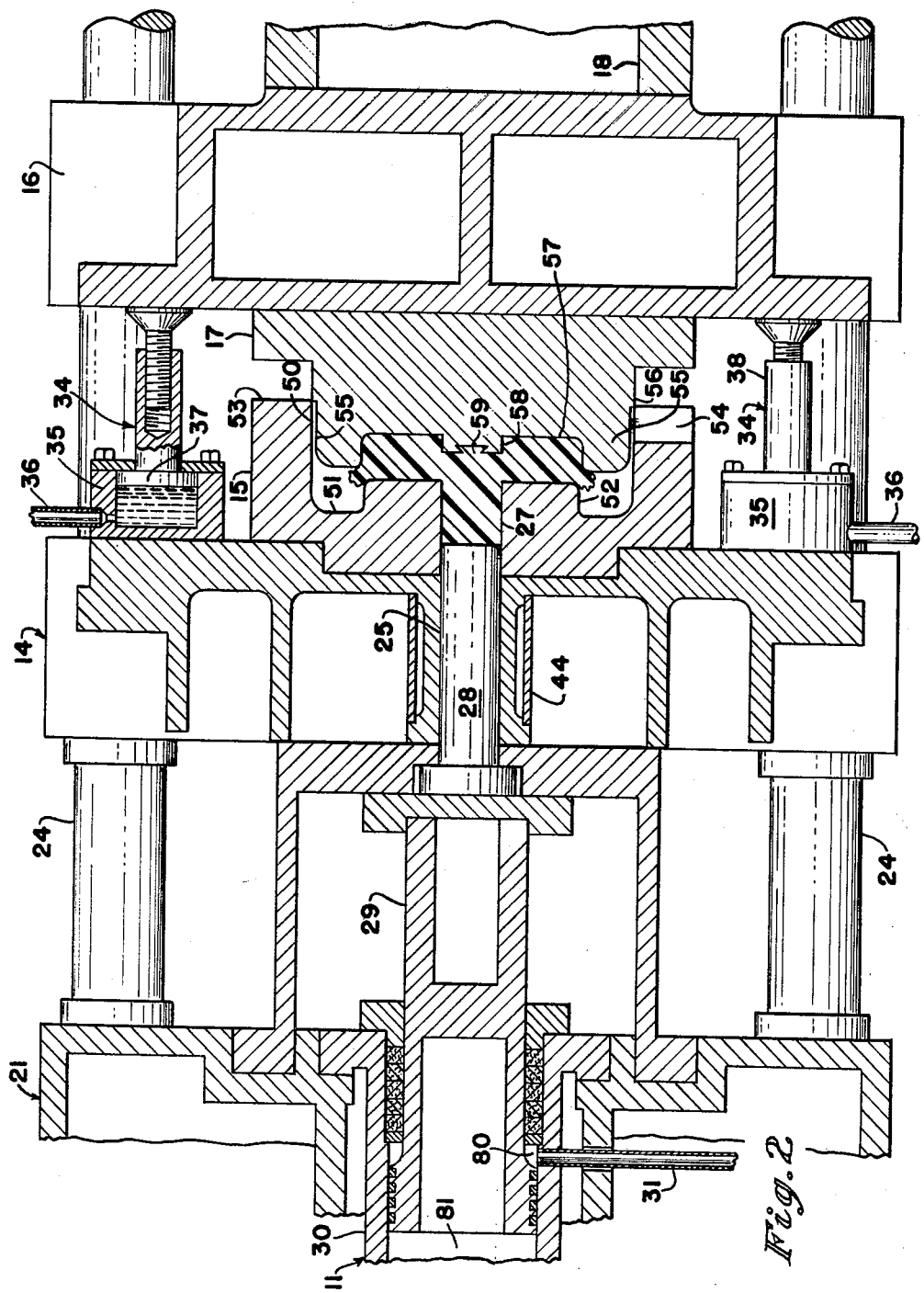
Figure 8:
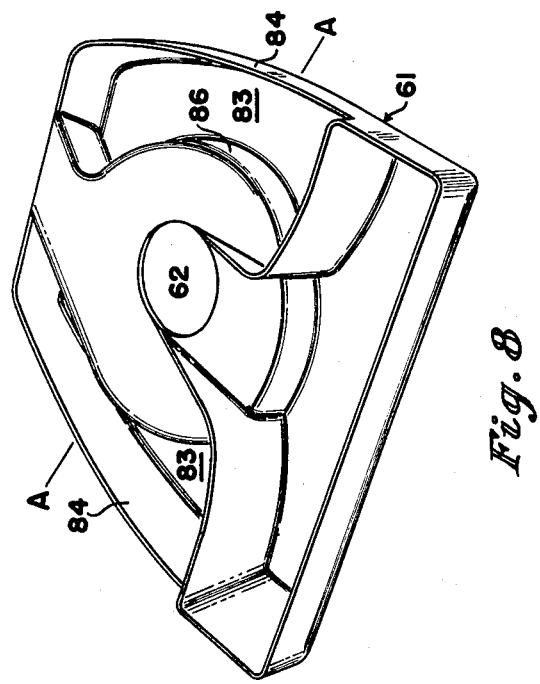
Figure 7:
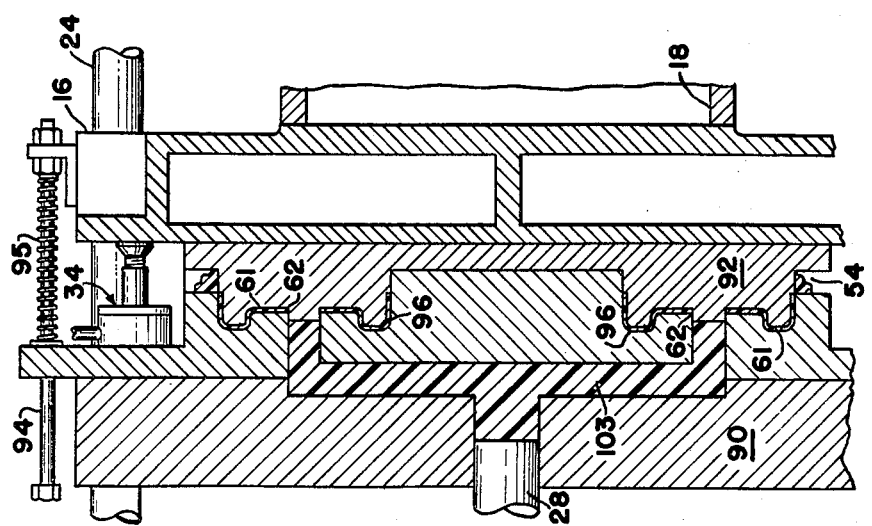

Other objects and advantages of the present invention will become apparent as the description proceeds when taken in connection with the accompanying drawings in which:

Fig. 1 is a vertical plan view partly in section of the molding machine of the present invention showing one form of mold applied, Fig. 2 is a cross sectional view through the mold and charging apparatus of Fig. 1 and showing the mold in partially closed position during the charging operation, Fig. 3 is a cross sectional view through the mold of Fig. 1 showing it in fully closed position, Fig. 4 is a cross sectional view of the charging mechanism adapted to be attached to the back of the apparatus of Fig. 1, Fig. 5 is a cross sectional view of a modified mold of the present invention adapted to be substituted for the mold of Fig. 1 and showing the mold in fully open position, Fig. 6 is a cross sectional view similar to that of Fig. 5 and showing the mold in its partially closed charging position, Fig. 7 is a cross sectional view similar to that of Figs. 5 and 6 and showing the mold in its fully closed position, and Fig. 8 is a perspective view of a molding produced by the apparatus of the present invention.

*General arrangement of Figs. 1 to 4*

Referring to the drawings, the base of the machine of the present invention is represented by the reference numeral 10 which supports an injection mechanism 11 and a die closing mechanism 12. Both the injection mechanism 11 and the die closing mechanism 12 are hydraulically operated and the hydraulic system is housed within a casing 13.

The apparatus includes a fixed platen 14 supporting a stationary die part 15, a movable platen or cross head 16 which carries a movable die part 17, a die closing piston 18, which cooperates with the die closing cylinder 19 rigidly atached to one end of the base 10 by means of a fixed head 20, an injection cylinder support 21 fixedly attached to the other end of the base 10, a plastic material plasticizing and transfer mechanism 22 (Fig. 4), which is suitably supported by the fixed platen 14, and a hydraulic system generally indicated by the reference numeral 23 and for the most part housed within the casing 13.

The injection cylinder support 21, the fixed platen 14, and the fixed head 20 are rigidly connected by tension rods 24, upon which the cross head 16 is mounted for reciprocation in a manner which will presently appear.

The fixed platen 14 is formed with an injection cylinder bore 25 adapted to receive a charge of plasticized plastic material through orifice 26 from the plasticizing mechanism 22 in a manner which will later appear. The stationary die part 15 is formed with a bore 27 in alignment with the bore 25 of the injection cylinder. An injection ram 28 is mounted for reciprocation in bore 25 and normally is positioned to the left of orifice 26 as viewed in Fig. 1.

The injection ram 28 is rigidly attached to the piston 29 of the injection device 21 and reciprocates within cylinder 30. Conduits 31 and 32, leading from the hydraulic system 23 are connected to the cylinder 30 as shown in Fig. 1 for a purpose which will later appear.

Mounted on the fixed platen 14 are a plurality of hydraulic stops 34 consisting of cylinders 35 connected by conduits 36 to a suitable source of fluid under pressure for a purpose which will be explained hereinafter. Slidably mounted within the cylinders 35 and reacting against the fluid pressure therein are pistons 37 (Fig. 2), having piston rods 38 adapted to contact movable platen 16 as it moves toward the fixed platen 14 for a purpose which will presently appear.

The plasticizing mechanism 22 comprises a housing 39 extending from one side of the fixed platen 14, provided with passages 40 having outlet and inlet connections 41 for circulation of a suitable heating medium. Supported within the housing 39 is a plasticizing cylinder 42 also provided with a passage 43 for a heating medium. The passage 43 may be extended as shown at 44 (Fig. 1) to surround the injection ram cylinder 25.

The cylinder 42 is provided with a bore 45 in which is housed a mixing and transfer screw 46. The spiral threads 47 of the transfer screw 46 are spaced farther apart at the outer end of screw 46 immediately beneath the hopper 48 than at the inner end adjacent the inlet orifice 26 to the injection cylinder 25 for a purpose which will later appear. The screw 46 is rotated by any suitable power source which may be controlled in timed relationship to the operation of the injection mechanism 11.

The interior formation of the die parts 15 and 17 form a principal part of the present invention. Fixed die part 15 is formed with a female opening 50, a depressed recess 51 and an annular raised portion or land 52 in which the bore 27 is formed. The annular rim 53 which forms female opening 50 is cut away at 54 for a purpose which will later appear. The movable die part 17 is formed with male projecting portion 55 enlarged at 56 so as to have a neat sliding fit with the female opening 50 to close off the interior of the mold as will later appear. The projection 55 is recessed at 57 so as to telescope over the portion 52 of the fixed die plate 15 and with a projecting boss 58 of a size to just slidably fit the fixed die bore 27 as will later appear. The boss 58 is provided with a dove tail undercut 59 for a purpose which will later appear.

The dimensions of the male and female die parts inside of the projection 55 are such as to form a die cavity 60 as shown in Fig. 3. The cavity 60 may be of any shape desired but according to the present invention it is so shaped as to form the molding 61 of Fig. 8 which is the main frame of a suction cleaner of a well known type having a fan eye 62. As will later appear the fan eye 62 is formed by the boss 58 as it enters the bore 27 to shut off the flow of plastic material into the die cavity 60.

The principal parts of the hydraulic control system 23 are mounted within the casing 13 and comprise, a storage tank 63 for hydraulic fluid, a motor-pump unit 64, a die closing control valve 65 and an injection ram control valve 66. The suction side of the motor pump unit 64 is connected to tank 63 by suction pipe 67 and its high pressure side is connected to tank 63 by high pressure pipe 68 and to the valve casings 65 and 66 by offshoot pipes 69 and 33 respectively. A valve 49 is adapted to cut off the flow in pipe 68 as will later appear. The end ports of valve 65 are connected to tank 63 by a U-shaped pipe 70 and nipple 71. The end ports of the valve 66 are connected to tank 63 by a U-shaped pipe 72 and a nipple 73. The intermediate ports of the valve 65 are connected by pipes 74 and 75 to the opposite ends of die closing cylinder 19. The intermediate ports of valve 66 are connected to the injection cylinder 30 by pipes 31 and 32 as shown in Fig. 1.

The valve 65 is a piston type valve of known construction, the piston of which is operated by a valve stem 76 for manual or automatic operation. The valve 66 is also a piston type valve adapted to be manually or automatically operated by valve stem 77.

Operation of hydraulic system

The valve 49 may be opened so that when the pump 64 is operating the hydraulic fluid will be circulated from tank 63 through pump 64 and pipe 68, back to tank 63 without developing any appreciable pressure in the system. Valve 49 may then be operated to close off the flow of fluid into tank 63 so that a pressure is built up in pipe 68. In the position shown in Fig. 1, the valve 65 is set so that hydraulic fluid will enter valve casing 65 through nipple 69 and flow by conduit 75 into the space 78 back of piston 18 and liquid will flow from space 79 surrounding piston 18, through pipe 74, valve 65 and conduits 70, 71 into the tank 63.

As pressure builds up in the pipe 68 due to the closing of the valve 49 leading to tank 63, liquid will flow into space 78 and move piston 18 forwardly and force liquid from space 79 into the tank 63.

As the piston moves forward there is little resistance to movement until the movable platen 16 comes into contact with the hydraulic piston rods 38 which apply a selected added resistance to the movement of the piston 18 which will result in a higher pressure in space 78 and pipe 68 in an attempt to overcome the increased resistance to movement of the piston 18.

As will be explained in more detail hereinafter the movable die part 17 has just entered the fixed die part 15 to close the mold cavity 60 as the movable platen 16 contacts the piston rods 38.

The increased pressure in space 78 will be reflected back into valve casing 66 through pipe 68 and nipple 33. The valve 66 is then manually or automatically actuated to deliver pressure fluid through pipe 32 into the outer end 81 of the cylinder 30 and to connect the conduit 31 to the interior of tank 63 for the return of hydraulic fluid from the inner end 80 of cylinder 30. That will cause the ram 28 to move forwardly and force any plastic material in the bore 25 into the partly closed mold cavity 60 as shown in Fig. 2.

The hydraulic pressure in stop cylinders 35 is such that a substantial force must be applied to piston rods 38 before that force is overcome. The pressure behind piston 18 will continue to build up until the pressure applied by the piston rods 38 is overcome and the movable die part will be completely closed as shown in Fig. 3.

As the die closes the boss 58 will enter bore 27 and thus prevent the high pressure in die cavity 60 from being reflected into the injection cylinder 25. The valve 66 may then be operated to supply pressure fluid through pipe 31 into the space 80 behind piston 29 and move the piston 29 to the left and at the same time forcing liquid from the space 81 through pipe 32 back into the tank 63.

In the meantime pressure will be building up back of piston 18 and the plastic material will flow into all parts of the die cavity 60 under very high pressure. Any excess material will be forced out through the cut out 54 as shown in Fig. 3.

After a short period of waiting until the material in the die cavity 60 has solidified, the valve 65 is manually or automatically actuated to apply pressure fluid to space 79 and to connect space 78 to the tank 63.

Fluid under pressure will then be introduced into the space 79 causing the piston 18 to move to the right, to remove the movable die part 17 from the fixed die part 15, the fluid in space 78 being displaced and returned to tank 63. As the piston 18 returns to its retracted position shown in Fig. 1, the valve 49 may be manually or automatically operated to permit fluid to be recirculated through tank 63 thus relieving the pressure in pipe 68.

Operation of entire machine

As shown in Figs. 1, 2 and 3 the section through the die cavity is taken on line A—A of Fig. 8 which represents the article to be molded. The projection 55 of the movable die part 17 forms the depressions 83 of molding 61, the walls 84 are formed by the space between the projection 55 and the outer rim 53 of the stationary die part 15, the walls 86 are formed by the space between the projection 55 of movable die part 17 and the land 52 of the fixed die part 15 and the fan eye is formed by the boss 58 entering the bore 27 of the fixed die part 15.

The remainder of the die cavity 60 is so shaped as to form the molding 61 in a manner obvious to those skilled in the art.

A thermoplastic material such as polyvinyl chloride, in granular form, is placed in hopper 48 and the screw 46 rotated by any suitable power mechanism. As the threads 47 advance the thermoplastic material through the bore 45, it will be heated by the hot liquid in passages 43 and 40 and thoroughly worked which will aid in heating the material to a flowable form. As the material advances between the end of screw 46 where the threads are closer together it is compressed which also adds more heat to the material. As the material reaches the orifice 26 is will be in a plastic or flowable state due to the heat applied which may be regulated to suit conditions depending upon the material used and the formation of the die cavity.

The plasticizer 42 is operated just long enough to inject the requisite amount of material through orifice 26 into the injection cylinder 25 to fill the mold cavity 60 and bore 27 with perhaps a slight excess. The rotation of screw 46 is then stopped, either manually or automatically.

The pump 64 having been put into operation, the valve 49 is actuated to cause the movable platen 16 to move against the piston rods 38 as previously explained, in which position the movable die part 17 will have moved into the position shown in Fig. 2 closing the die cavity 60 except for the cut out 54 and bore 27.

The valve 66 is then actuated as previously explained to move the piston 29 to the right as viewed in Fig. 1 so as to inject the plastic material contained in injection cylinder 25 into the mold cavity 60, the material taking the position shown in Fig. 2. Since the mold is not completely closed when the plastic material is injected, the injection pressure need not be high.

In the meantime pressure has been building up behind piston 18 and eventually that pressure will collapse the hydraulic pistons 37 as explained above and permit the movable die part 17 to move to its fully closed position shown in Fig. 3. The pressure will continue to build up and the plastic material will thus be forced into all parts of the die cavity 60. Air and any excess material will be forced out through cut out 54.

At the die is completely closed the boss 58 enters bore 27 so that the increased molding pressure will not be reflected into the charging cylinder 25. The die parts 15 and 17 are then permitted to remain closed for a period until the plastic material has hardened, after which the valve 65 is actuated to retract the piston 18 to the right as previously described to open the die parts 15 and 17 whereby the finished molding 61 may be easily removed. It is to be noted that the molding 61 is completely finished since the entry of the boss 58 into the bore 27 separated the excess material in bore 27 from the molding itself. As the die part 17 moves away from the fixed die part 15 the excess material in bore 27 will follow the movement of the die part 17 because of the dove tail interlock 59 on boss 58, from which it may be easily removed, as is obvious.

After the die parts 15 and 17 are completely closed the valve 66 may be operated as previously described to retract the injection ram 28 and the plasticizing mechanism 22 operated as previously described to supply another charge of plasticized material into the injection cylinder 25.

When the molding 61 and the excess material have been removed from the die plates the hydraulic system 23 may be actuated as previously described to repeat the molding operation.

The modification of Figs. 1 to 4 inclusive, in addition to forming the finished molding 61 including the fan eye 62 also results in a reduction in the injection pressure in the injection bore 25 because the plastic material is injected into the die cavity before it is completely closed while at the same time rendering it possible to have a very high molding pressure since the boss 58 entering the bore 27 prevents the high molding pressure from acting against the inner end of the injection ram 28.

Description of Figs. 5 to 7

The modification of Figs. 5 to 7 inclusive is a multiple cavity mold for simultaneously molding a plurality of the moldings 61 as shown in Fig. 8.

This modification is intended to be used with the machine of the modification of Figs. 1 to 4 inclusive, as a substitute for the die parts of that modification.

In this modification a three plate mold is provided including a fixed die platen 90, a central die part 91 and a pressure die part 92.

The fixed die platen 90 is provided with a charging bore 93 which lines up with the injection bore 25 of Fig. 1 and into which the ram 28 enters during its injection stroke. The pressure die part 92 is carried by the movable platen 16 of Fig. 1. The ram 28 and the movable platen 16 are moved in the same manner and in the same sequence as explained in connection with the modification of Figs. 1 to 4 inclusive.

The central die part 91 is carried by the movable platen 16 by a lost motion connection in the form of rods 94 surrounded by springs 95 which normally urge the central die part 91 away from the pressure die part 92.

The hydraulic stops 34 are secured to the central die part 91 and move with it in a manner which will presently appear.

The mating surfaces of the central die part 91 and the pressure die part 92, when the die is fully closed, form die cavities 96 which are of exactly the same shape and size as the cavity 60 of the first modification. The pressure die part 92 is formed with a plurality of plungers 97 which enter bores formed in the central die part 91 to close the die cavities 96 as will be explained hereinafter in a manner similar to that of the first modification. The pressure die part 92 is also formed with bosses 99 which enter charging openings 100 formed in the central die plate 91 to close the openings 100 as the die plates approach their completely closed position.

While for the purposes of clarity only two die cavities 60 are shown, four or more of such cavities may be formed. For example, two more may be formed at right angles to those shown.

The fixed die platen 90 and the central die part 91 are formed with mating gate recesses 101 and 102 which together form runner gates leading from the charging bore 93 to the openings 100 when the mold is partially closed as will presently appear.

Operation of Figs. 5 to 7

The movable platen 16 is moved downwardly in the manner described in connection with the first modification to move the pressure die part 92 toward the fixed die platen 90 and the central die part 91 moves with it until it comes into contact with the fixed die platen 90 which will arrest further downward movement of the central die part 91. The pressure die part 92 will continue to move downwardly toward the central die part 91, the springs 95 being compressed in the process. That movement will continue until the movable platen comes into contact with the upper ends of the piston rods 37 at which time such movement will be momentarily arrested until the pressure within the stops 34 is overcome as described in connection with the first modification.

The above described position is shown in Fig. 6 and it is to be noted that the plungers 97 have entered the bores 98 to close the top of bores 98 but have not entered far enough to completely close the mold cavities 96.

During the period that downward movement of the pressure die part 92 is momentarily arrested the plunger 28 is operated in the manner described in connection with the first modification to inject the proper quantity of plastic material into the partially closed die cavities 96 as shown in Fig. 6.

As the pressure behind the movable platen 16 increases as explained in connection with the first modification, the pressure of the hydraulic stops 34 is overcome and the pressure die part 92 resumes its movement toward the central die part 91 and forces the plastic material into all parts of the cavities 96. At a point in the above described movement the bosses 99 enters the openings 100 before the pressure within the die cavities comes up to maximum pressure so as to cut off communication between the interior of the die cavities 96 and the bore 93 and thus prevent the final high molding pressure from being reflected against the ram 28 so as to protect the injection apparatus from the final high molding pressure.

The final position of the die plates is shown in Fig. 7 and it is to be noted that each of the molding 61, including the fan eye 62, are completely formed and completely separated from the sprue material 103.

As soon as the pressure die part 92 has moved to a position in which the bosses 99 have entered the openings 100 to close off the interior of the die cavities 96 from the bore 93, the plunger 28 may be retracted and the injection cylinder charged with a new charge of plastic material ready for the next succeeding molding operation as explained in connection with the first modification.

When the die cavities are completely closed and after a short period of delay to permit the plastic material to harden, the movable platen 16 is retracted in the manner explained in connection with the first modification.

During the first part of such movement, the pressure die part 92 will be separated from the central die part 91 to expose the molding 61 for removal. As the movable platen 16 is retracted the heads of rods 94 will engage the central die part 91 and remove it from the fixed die platen 90 and expose the sprue material 103 for removal, it being noted that the sprue material 103 is unattached to the moldings 61 due to the bosses 99 entering the openings 100 before the final molding operation takes place, thus rendering it a simple matter to remove the sprue material after the molding operation.

According to both modifications, the movement of the male die part toward the female die part is arrested before the die cavity is completely closed and the plastic material injected into the die cavity under comparatively low pressure. Pressure is then built up behind the male die part to overcome the arresting force and the male die part continues to move into the female die part. At a point in the movement of the male die part into the female die part the entrance to the die cavity is cut off. As the male die part moves to its fully closed position the pressure behind it is built up so that the plastic material is forced into all parts of the die cavity under very high pressure and since the inlet opening into the die cavity is closed this high pressure is not reflected into the injection cylinder. The important feature of the invention is that the entrance to the die cavity is closed before the dies are completely closed which in addition to protecting the injection apparatus from the high molding pressures also separates the sprue material from the finished molding and forms the fan eye of the finished molding.

From the foregoing it can be seen that in both modifications of the present invention complete moldings may be formed without the necessity of any trimming after molding. Since the molding is not attached to any sprue material it is easily removed from the mold. Also since the sprue material is not attached to the molding the sprue material may also be easily removed from the mold.

While I have shown and described but two embodiments of my invention, it is to be understood that those embodiments are to be taken as illustrative only and not in a limiting sense. I do not wish to be limited to the particular structure shown and described but to include all equivalent variations except as limited by the scope of the claims.

I claim:

1. In a molding machine, a pair of die parts one of which is movable toward the other, a die cavity formed in the mating faces of said die parts when said parts are completely closed, one of said die parts being formed with a charging opening and the other being formed with a projecting boss positioned to close said charging opening as said movable die part moves toward the other, means for moving said movable die part toward said other die part, means for arresting such movement when said die cavity is only partially closed, and means for injecting a moldable material into said mold cavity through said charging opening while movement of said movable die part is arrested, said moving means being constructed to continue movement of said movable die part toward its die cavity closing position after a time delay caused by said arresting means, said boss being so related to said charging opening that it enters said opening prior to the movement of said movable die part to its final die cavity closing position so as to separate the inflowing moldable material from the material in said die cavity and said moving means being constructed to apply an additional final pressure to said movable die part after said boss has entered said charging opening to force the moldable material within said die cavity into all parts thereof.

2. In a molding machine according to claim 1 including a movable platen to which said movable die part is attached and a fixed platen against which said other die part is pressed during the final closing movement of said movable die part and said charging opening forms a recess for sprue material which is separated from the material in said mold cavity when said boss enters said charging opening.

3. In a molding machine according to claim 2 in which said other die part is movably carried by said movable platen by means of a lost motion connection and is moved against said fixed platen prior to the movement of said movable die part toward said other die part and in which said charging opening is formed in part by recesses formed in the mating faces of said fixed platen and said other die part whereby the sprue material may be easily removed from said charging opening when said other die part is separated from said fixed platen.

References Cited in the file of this patent

UNITED STATES PATENTS

| | | |
|---|---|---|
| 941,291 | Wickex | Nov. 23, 1909 |
| 2,471,148 | Gale et al. | May 24, 1949 |
| 2,582,260 | Kutik | Jan. 15, 1952 |